March 9, 1926.
T. H. THOMAS
1,575,726
TRIPLE VALVE DEVICE
Filed April 28, 1924
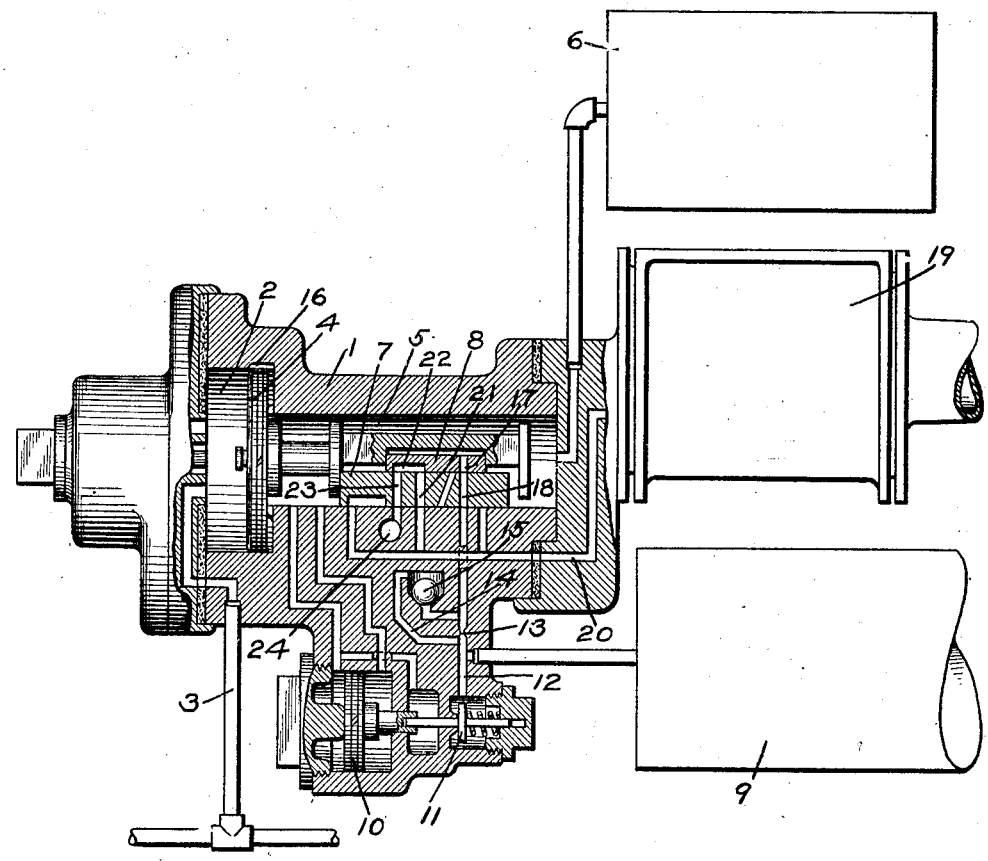
INVENTOR
THOMAS H. THOMAS
BY *Wm. M. Cady*
ATTORNEY Patented Mar. 9, 1926.

1,575,726

UNITED STATES PATENT OFFICE.

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

TRIPLE-VALVE DEVICE.

Application filed April 28, 1924. Serial No. 709,323.

*To all whom it may concern:*

Be it known that I, THOMAS H. THOMAS, a citizen of the United States, residing at Edgewood, in the county of Allegheny and State of Pennsylvania, have invented new and useful Improvements in Triple-Valve Devices, of which the following is a specification.

This invention relates to triple valve devices of the type having means for effecting a graduated release of the brakes.

According to one form of graduated release, a supplemental reservoir is provided which is adapted to be charged through the slide valves of the triple valve device, when the triple valve is in release position, so that when the brake pipe pressure is gradually increased after a brake applicaton, the triple valve parts will be moved to release position, in which fluid is vented from the supplemental reservoir to the auxiliary reservoir side of the triple valve piston, to thereby shift the triple valve parts from release position, after a partial exhaust of fluid from the brake cylinder, thus causing a graduated release of the brakes.

Where a graduated release triple valve device of the above character is employed on long trains, it is necessary to restrict the rate of exhaust from the brake cylinder and to correspondingly restrict the rate of flow from the supplemental reservoir to the auxiliary reservoir, in order to insure that the graduated release feature will properly function on all the cars of the train. The restriction of the communication from the supplemental reservoir to the auxiliary reservoir, however, will also retard the flow from the auxiliary reservoir to the supplemental reservoir when the supplemental reservoir is being charged, and this tends to delay the operation of the train.

The principal object of my invention is to provide means for permitting a quick recharge of the supplemeental reservoir while restricting the rate of flow from the supplemental reservoir to the auxiliary reservoir.

In the accompanying drawing, the single figure is a diagrammatic view of a fluid pressure brake equipment including a graduated release triple valve device embodying my improvement.

The triple valve device may comprise a casing 1 having a piston chamber 2 connected to the usual brake pipe 3 and containing piston 4 and a valve chamber 5 connected to the auxiliary reservoir 6 and containing a main slide valve 7 and a graduating slide valve 8 adapted to be operated by piston 4.

A supplemental reservoir 9 is provided, and for controlling the supply of fluid from said reservoir to the brake cylinder in an emergency application of the brakes, a valve device is provided comprising a piston 10 and a valve 11 adapted to be operated by said piston in an emergency application of the brakes for supplying fluid from the supplemental reservoir 9 to valve chamber 5 so as to add the volume of the supplemental reservoir to that of the auxiliary reservoir 6.

A passage 12 having a restricted portion 13 leads from the supplemental reservoir 9 to the seat of slide valve 7 and according to my improvement, a by-pass passage 14 is provided around the restricted portion 13. Said by-pass passage contains a ball check valve 15 adapted to permit flow from the auxiliary reservoir to the supplemental reservoir but cutting off flow in the opposite direction.

In operation, when the triple valve parts are in release position, as shown in the drawing, the valve chamber 5 and the auxiliary reservoir 6 are charged in the usual manner from the brake pipe 3 by way of the usual feed groove 16, around the triple valve piston 4. The supplemental reservoir 9 is also charged through ports 17 and 18 in the graduating valve 8 and the main slide valve 7, by way of passage 12. Fluid flows through the restricted portion 13 of passage 12 and also through the by-pass passage 14, past the check valve 15, so that a quick charging of the supplemental reservoir 9 is provided.

After the brakes have been applied by the usual movement of the triple valve piston 4 to application position upon a reduction in brake pipe pressure, the release of the brakes may be graduated by making a gradual increase in brake pipe pressure. The triple valve piston 4 is thereupon shifted to release position and brake cylinder 19 is connected through passage 20, port 21, cavity 22 in graduating valve 8 and port 23 with exhaust port 24, so that fluid is vented from the brake cylinder. At the same time, ports 17 and 18 register with passage 12, so that fluid under pressure is supplied from the charged supplemental reservoir 9 to the valve chamber 5 by way of the restricted portion 13, the by-pass 14 being closed to flow in this direction by check valve 15.

The increase in pressure in the valve chamber 5, as thus effected, then shifts the piston 4 outwardly, so as to operate the graduating valve 8 to cut off the communication through which fluid is exhausted from the brake cylinder.

It will now be seen that with the above described construction, flow of fluid from the supplemental reservoir to the auxiliary reservoir to effect a graduated release of the brakes may be restricted as desired to correspond with the rate of discharge from the brake cylinder, while the quick charging of the supplemental reservoir is provided for by means of the by-pass passage 14.

Having now described my invention, what I claim as new and desire to secure by Letters Patent, is:—

1. In a fluid pressure brake, the combination with an auxiliary reservoir, a brake cylinder, and a triple valve device, of a supplemental reservoir, a passage having a restricted portion, through which fluid is supplied from the supplemental reservoir to the auxiliary reservoir for effecting a graduated release of the brakes, and an additional passage through which fluid is supplied from the auxiliary reservoir side of the triple valve device to the supplemental reservoir for charging the supplemental reservoir.

2. In a fluid pressure brake, the combination with an auxiliary reservoir, a brake cylinder, and a triple valve device, of a supplemental reservoir, a passage having a restricted portion, through which fluid is supplied from the supplemental reservoir to the auxiliary reservoir for effecting a graduated release of the brakes, and a by-pass around said restricted portion containing a check valve adapted to permit flow from the auxiliary reservoir side of the triple valve device to the supplemental reservoir and prevent flow from the supplemental reservoir to the auxiliary reservoir.

3. In a fluid pressure brake, the combination with an auxiliary reservoir, a brake cylinder, and a triple valve device comprising a piston and valve means operated by said piston for controlling the release of fluid from the brake cylinder, of a supplemental reservoir, a passage having a restricted portion and adapted to connect the supplemental reservoir with the auxiliary reservoir in the release position of said valve means, and a by-pass passage around said restricted portion containing a check valve adapted to prevent flow from the supplemental reservoir to the auxiliary reservoir.

In testimony whereof I have hereunto set my hand.

THOMAS H. THOMAS.